United States Patent [19]
Arai

[11] Patent Number: 4,464,279
[45] Date of Patent: Aug. 7, 1984

[54] MAGNETIC RECORDING MEDIUM

[75] Inventor: Mitutaka Arai, Hino, Japan

[73] Assignee: Konishiroku Photo Industry Co., Ltd., Tokyo, Japan

[21] Appl. No.: 435,103

[22] Filed: Oct. 18, 1982

[30] Foreign Application Priority Data

Oct. 20, 1981 [JP] Japan ................. 56-167706

[51] Int. Cl.$^3$ .............................. C04B 35/04
[52] U.S. Cl. ................ 252/62.54; 252/62.53; 428/457; 428/694; 428/900
[58] Field of Search ............ 252/62.53, 62.54; 428/900, 694, 457

[56] References Cited

U.S. PATENT DOCUMENTS 3,585,141  6/1971  Ingersoll .............. 252/62.54
4,305,993  12/1981  Zaitsu et al. ............ 428/328

Primary Examiner—Arthur P. Demers
Attorney, Agent, or Firm—Jordan B. Bierman; Linda Bierman

[57] ABSTRACT

Magnetic recording medium having a non-magnetic support carrying a magnetic layer, the layer comprising a ferromagnetic powder, a binder, and a Nitrogen containing compound, which is able to complex with Iron ions wherein the stability constant of the Nitrogen compound and Iron ions is at least 15.

9 Claims, 1 Drawing Figure

MAGNETIC RECORDING MEDIUM

The present invention relates to a magnetic recording medium which uses a metallic powder as the magnetic powder therefor, and is intended to provide an oxidation-resistant magnetic recording medium which is improved on the dispersibility thereof.

Those ferromagnetic materials applicable to a magnetic recording medium include ferromagnetic iron oxide, cobalt ferrite, ferromagnetic chromium dioxide, or ferromagnetic metallic powder and ferromagnetic metallic thin film, and the like.

In recent years, particularly, an importance has been attached to a system capable of recording shortwave signals in high densities, and in keeping with this, there has been demanded the realization of a ferromagnetic material having such magnetic recording characteristics suitable for the high density recording as, e.g., a fairly large antimagnetic force as well as a high residual magnetic flux density.

As such ferromagnetic materials as less demagnetizable by heat, pressure, etc., and adaptable to the high density recording, metallic magnetic materials are most promising.

For the obtaining of powdery metallic magnetic materials there have been known various methods such as, for example, those in which (1) the oxalate of a metal capable of producing a ferromagnetic material is reduced in a hydrogen gas flow at a high temperature as described in Japanese Patent Examined Publication Nos. 11412/1961, 22230/1961, 14809/1963, 8027/1965, 14818/1966, 22394/1968, 38417/1972, and the like, (2) Needle-crystalline $\gamma$-$Fe_2O_3$ is reduced in a hydrogen gas flow at high temperature as described in Japanese Patent Examined Publication Nos. 3862/1960, 39477/1972, and the like, and U.S. Pat. Nos. 3,607,220, 3,681,018 and 3,598,568, and British Pat. No. 1,192,167, and the like.

(3) a ferromagnetic metal is vaporized in an inert gas flow as described in Japanese Patent Examined Publication No. 27718/1972, and Japanese Patent Open to Public Inspection (hereinafter referred to as Japanese Patent O.P.I. Publication) Nos. 25662/1973, 25663/1973, 25664/1973, 25665/1973, 55400/1973, and the like, (4) a carbonyl compound of a metal capable of producing a ferromagnetic material is decomposed as described in Japanese Patent Examined Publication Nos. 128/1963, 3415/1965, and the like, and U.S. Pat. Nos. 2,983,997, 3,172,776, 3,200,007, 3,228,882, and the like, (5) a ferromagnetic metal is electrodeposited into mercury with use of a mercury cathode, and then the deposit is separated from the mercury by heating as described in Japanese Patent Examined Publication Nos. 787/1964, 15525/1964 and 8123/1965, and U.S. Pat. No. 3,156,650, and (6) a reducing agent such as a borohydride compound, phosphinate, or hydrazine, etc. is used to reduce a ferromagnetic material producible metallic salt in an aqueous solution thereof to thereby obtain a ferromagnetic material powder as described in Japanese Patent Examined Publication Nos. 26555/1963, 4567/1966, 4769/1966, 20116/1968, 16052/1972, 41718/1972, Japanese Patent O.P.I. Publication Nos. 1353/1972, 79754/1973, and the like, and U.S. Pat. Nos. 3,206,338, 3,700,499, 3,494,760, 3,535,104, 3,567,525, 3,663,318, 3,661,556, and the like.

However, a magnetic recording medium produced in such a manner that a ferromagnetic metallic powder produced by one of these methods is kneaded with and dispersed into a binder material and dispersant, etc., and the kneaded material is coated on a support is so unsatisfactory in the dispersibility, smoothness on the surface and wear resistance that there is much difficulty in using it for such a shortwave recording tape as a video tape. This is considered due to the fact that the ferromagnetic powder is active and has a hydrophilic nature that cannot adapt to any normally hydrophobic binder material.

In addition, when the obtained recording medium is exposed to air at a high temperature and humidity there occurs a phenomenon that the magnetic flux density of the magnetic recording medium becomes reduced due to the oxidation of the alloy in the medium.

In order to avoid such problems there have hitherto been proposed various methods such as, for example, those in which a magnetic metallic powder, immediately after being produced by a reduction reaction, is immersed in an organic solvent, and then taken out of the solvent into air to be gradually oxidized with volatilizing the solvent from the powder, thereby forming a thin oxide coat on the particle surface; a magnetic metallic powder and a higher fatty acid salt powder are stirred to be mixed in an organic solvent to thereby form a higher fatty acid base coat on the particle surface; a metallic vapor produced by decomposing by heating an organic metallic compound comprising a metal that is less oxidizable than a magnetic metal is brought into contact with a magnetic powder to thereby form a metallic coat on the particle surface; a silicone oil coat is formed on the particle surface; and the like (as described in e.g., Japanese Patent O.P.I. Publication Nos. 112465/1976 and 67859/1977, Japanese Patent Examined Publication No. 20116/1968, and Japanese Patent O.P.I. Publication Nos. 8798/1978, 67250/1976, 11703/1979, 46509/1979, 39660/1980, 105337/1981, 39662/1980, 154607/1977, 155398/1977, 85602/1980, and the like), but no satisfactory magnetic recording medium has yet been obtained, and various characteristics other than the antioxidation characteristic have hardly been taken into consideration.

It is an object of the present invention to provide a magnetic recording medium whose electromagnetic conversion characteristic is prevented from being deteriorated.

It is another object of the present invention to provide a magnetic recording medium whose ferromagnetic metallic powder is improved on the dispersibility thereof, which has an increased oxidation resistance under high temperature and humidity, and whose magnetic flux density is improved so as to be less deteriorated with time.

As a result of our various investigations, it has now been found that the above-described objects are attained with a magnetic is recording material having a nonmagnetic support provided thereon with a magnetic layer in the binder of which a ferromagnetic metallic powder is dispersed, the magnetic layer comprising a nitrogen-containing compound whose stability constant with iron ions is not less than 15 (hereinafter referred to as the compound of the present invention).

In the present invention, the foregoing objects may be attained by incorporating the compound of the present invention into the magnetic layer. To be concrete, the magnetic layer may be provided either by treating a ferromagnetic metallic powder with the compound of the present invention and incorporating the treated ferromagnetic metallic powder into the magnetic layer or by dispersing the compound of the present invention and a ferromagnetic metallic powder into a binder material.

The compound of the present invention is such that the stability constant thereof with iron ions is not less than 15, and the compound contains a nitrogen atom in the structure thereof, the nitrogen atom being contained in the form of a nitrogen-containing heterocyclic ring and/or amino group. The nitrogen-containing heterocyclic ring is desirable to be of 5- or 6-member ring. The nitrogen-containing heterocyclic ring and amino group are allowed to have arbitrary substituents. In the case where the compound of the present invention has an amino group, it is desirable that an aromatic group is substituted with an amino group. Those preferred as the above-described substituent include hydroxy, lower alkyls (such alkyls having from 1 to 4 carbon atoms as, e.g., methyl, ethyl, propyl, isopropyl, n-butyl, sec-butyl, t-butyl), carboxy, phenyl, alkoxys (such as methoxy, ethoxy, butoxy), halogens (such as chloride, bromine, iodine), and the like.

Those compounds of the present invention may be represented by the formula:

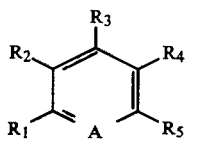

Formula (I)

wherein $R_1$ and $R_5$ each is a hydrogen atom, —COOM, hydroxyl or a lower alkyl group (such an alkyl having from 1 to 4 carbon atoms as, e.g., methyl, ethyl, propyl, isopropyl, butyl, sec-butyl, t-butyl, etc.); $R_2$ and $R_4$ each is a hydrogen atom, —COOM, pyridyl, amino, hydroxyl, —SO$_3$M or a lower alkyl group having from 1 to 4 carbon atoms; $R_3$ is a hydrogen atom or a hydroxyl group; M is a hydrogen atom or an alkaline metal such as Li, Na, K, etc.; and A is a nitrogen atom or

Further, $R_1$ and $R_2$ are allowed to link with each other to form a benzene ring, the benzene ring being allowed to have a substituent (such as, e.g., hydroxy, a lower alkyl, carboxy, phenyl, an alkoxy, a halogen, amino, sulfo, pyridyl, etc.), and also allowed to form a condensed ring (pyridine ring).

The compound of the present invention, if used in a quantity of from 0.1 to 10% by weight to that of a magnetic powder, has an effective dispersibility and oxidation resistance, but, if used in a quantity of not less than 5% by weight, is likely to reduce the initial saturated magnetization quantity. Therefore the compound is desirable to be used within the range of from 0.1 to 5% by weight.

Examples of the compound of the present invention include the following compounds:

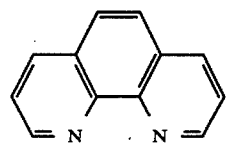

1,10-phenanthroline

1.

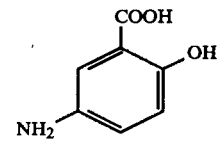

5-amino-salicyclic acid

2.

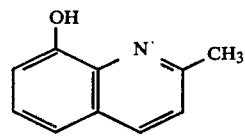

2-methyl-8-hydroxyquinoline

3.

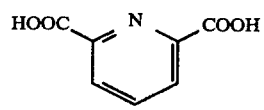

Pyridine-2,6-dicarboxylic acid

4.

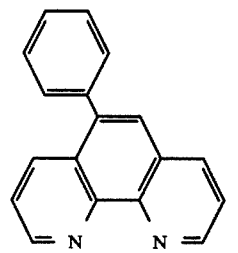

5-phenyl-1,10-phenanthroline

5.

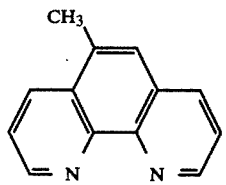

5-methyl-1,10-phenanthroline

6.

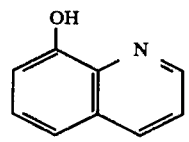

8-hydroxyquinoline

7.

-continued

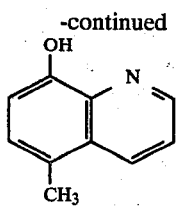

8-hydroxy-5-methyl-quinoline

8.

The aforementioned stability constant is most frequently used as a measure to represent the stability of a complex, and expressed in terms of the reciprocal of the dissociation constant of a complex. In the case where ligand A and metallic ion M produce such a complex as [MAn], if $M+A \rightleftharpoons MA$, $MA+A \rightleftharpoons MA_2$, ..., $MA_{n-1}+A \rightleftharpoons MAn$, then the respective equilibrium constants are $$K_1 = \frac{[MA]}{[M][A]}, K_2 = \frac{[MA2]}{[MA][A]}, \ldots K_n = \frac{[MAn]}{[MA_{n-1}][A]}$$

wherein these bracketed represent the respective concentrations. These $K_1, K_2, \ldots K_n$ are called the sequential stability constants. And also $$K_1, K_2 \ldots K_n = K = \frac{[MAn]}{[M][A]^n}$$

wherein K is called the total stability constant, but, in general, this K is merely called the stability constant.

The respective ion concentrations are obtained either by measuring solutions of various ionic strengths to obtain apparent constants in the respective ionic strengths and extrapolating the apparent constants down to the zero ionic strength, or by obtaining activity coefficients by calculation and determining values according to the activities therefrom.

The compound of the present invention requires a stability constant of not less than 15. If the stability constant of the compound is less than 15, the ferromagnetic powder becomes unsatisfactory in respect of the dispersibility thereof and largely oxidized at a high temperature and humidity, and the magnetic flux density thereof becomes largely changed with time, and consequently the objects of the present invention can not or can very hardly be attained.

Generally, a magnetic coating contains as the principal components thereof a ferromagnetic powder, binder and coating solvent, and also contains, if necessary, such additives as a dispersant, lubricant, abrasives, antistatic agent, and the like. The magnetic coating is prepared by dissolving and dispersing the above-described component materials into an organic solvent. The thus prepared material is then coated on a non-magnetic support, thereby forming a magnetic recording layer.

Methods for the production of such magnetic coating materials applicable to the present invention are described in detail in Japanese Patent Examined Publication Nos. 15/1960, 26794/1964, 186/1968, 28043/1972, 28045/1972, 28046/1972, 28048/1972, 31445/1972, 11162/1973, 21331/1973 and 33683/1973, and U.S.S.R Pat. No. 308033, and the like.

Those binder materials applicable to the present invention include conventionally known thermoplastic resins, thermosetting resins, reactive type resins and mixtures of these resins.

Those thermoplastic resins applicable to this invention are of a softening point of not more than 150° C., of an average molecular weight of from 10,000 to 200,000, and of a polymerization degree of from about 200 to about 2000, and include, e.g., vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomer, polyvinyl fluoride, vinylidene chloride-acrylonitrile copolymers, acrylonitrile-butadiene copolymers, polyamide resins, polyvinyl butylal, cellulose derivatives (such as cellulose acetate butyrate, cellulose diacetate, cellulose triacetate, cellulose propionate, nitrocellulose, etc.), styrene-butadiene copolymers, polyester resins, chlorovinyl etheracrylic acid ester copolymers, amino resins, various synthetic-rubber thermoplastic resins, and mixtures of these compounds.

These resins are described in Japanese Patent Examined Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, and 27886/1973, and U.S. Pat. Nos. 3,144,352, 3,419,420, 3,499,789, and 3,713,887.

Those thermosetting or reactive type resins usable in the invention are of a molecular weight of not more than 200,000 in the coating liquid form, which molecular weight, after coating and drying, becomes infinite due to the condensation reaction or addition reaction. Those preferred among these resins are ones that are neither softened nor fused until the time when thermally decomposed. Examples of such resins include, e.g., phenol resins, epoxy resins, polyurethane curing type resins, urea resin, melamine resin, alkyd resins, silicone resins, acryl type reactive resins, mixtures of macromolecular polyester resins with isocyanate prepolymers, mixtures of methacrylate copolymers with diisocyanate prepolymers, mixtures of polyester polyols with polyisocyanates, urea-formaldehyde resins, mixtures of low molecular weight glycols/macromolecular diols/triphenyl-methane-triisocyanates, and polyamine resins, and mixtures of these resins.

These resins are described in Japanese Patent Examined Publication Nos. 8103/1964, 9779/1965, 7192/1966, 8106/1966, 14275/1966, 18179/1967, 12081/1968, 28023/1969, 14501/1970, 24902/1970, 13103/1971, 22067/1972, 22072/1972, 22073/1972, 28045/1972, 28048/1972 and 28922/1972, and U.S. Pat. Nos. 3,144,353, 3,320,090, 3,437,510, 3,597,273, 3,781,210 and 3,781,211.

These binder materials may be used singly or in combination, and, if necessary, used with the addition of other additives thereto. The mixing proportion of the binder material to the ferromagnetic powder is used within the range of from 10 to 400 parts by weight, preferably from 30 to 200 parts by weight of the binder material to 100 parts by weight of the ferromagnetic powder. The binder material, if in excess of the above range, when it becomes a magnetic recording medium, causes the recording density to decrease, while if in a quantity below the range, causes the strength of the magnetic recording layer to become deteriorated, resulting in such undesirable phenomena as a reduced endurance or exfoliation of the binder, and the like.

To the magnetic recording layer, in addition to the abovedescribed binder and ferromagnetic powder, there may be added a dispersant, lubricant, abrasives, antistatic agent, and the like.

Those applicable dispersants include such fatty acids having from 12 to 18 carbon atoms ($R_4COOH$ wherein $R_4$ represents an alkyl having from 11 to 17 carbon atoms) as caprylic acid, capric acid, lauric acid, myristic acid, palmitic acid, stearic acid, oleic acid, elaidic acid, linolic acid, linolenic acid, and the like; those metallic soaps including alkali metal (Li, Na, K, etc.) salts or alkaline earth metal (Mg, Ca, Ba, etc.) salts of the abovementioned fatty acids; lecithin; and the like. Besides these, higher alcohols and sulfuric acid esters may also be used.

These dispersants are to be added within the range of from 1 to 20 parts by weight to 100 parts by weight of the binder.

These dispersants are described in Japanese Patent Examined Publication Nos. 28369/1964, 17945/1969 and 15001/1973, and U.S. Pat. Nos. 3,587,993 and 3,470,021.

Those lubricants to be used include silicone oil, carbon black, graphite, carbon black-graft copolymer, molybdenum disulfide, tungsten disulfide, and those fatty acid esters (the so-called wax) composed of a monobasic fatty acid having from 12 to 16 carbon atoms and a monohydric alcohol, the fatty acid ester being of from 21 to 23 carbon atoms in total including the number of carbon atoms of the above fatty acid. These lubricants are to be added in a quantity of from 0.2 to 20 parts by weight to 100 parts by weight of the binder. These matters are described in Japanese Patent Examined Publication Nos. 23889/1968 and 81543/1968, and U.S. Pat. Nos. 3,470,021, 3,492,235, 3,497,411, 3,523,086, 3,625,760, 3,630,772, 3,634,253, 3,642,539 and 3,687,725, and IBM Technical Disclosure Bulletin Vol. 9, No. 7, Page 779 (December 1966), and ELEKTRONIK 1961, No. 12, Page 380, and the like.

Those abrasives to be used include fused alumina, silicon carbide chromium oxide, corundum, artificial corundum, diamond, artificial diamond, garnet, and emery (principal components: corundum and magnetite). Those preferred among these abrasives are of an average particle size of from 0.05 to $5\mu$, and most preferably from 0.1 to $2\mu$. These abrasives are added in a quantity within the range of from 7 to 20 parts by weight to 100 parts by weight of the binder material. These abrasives are described in Japanese Patent O.P.I. Publication No. 115510/1974, U.S. Pat. Nos. 3,007,807, 3,041,196 and 3,687,725, British Pat. No. 1,145,349, and West German (DT-PS) Pat. No. 853,211.

Those antistatic agents to be used include such conductive material powders as graphite, carbon black, carbon black graft polymers, and the like; such natural surfactants as saponin; such nonionic surfactants as alkylene oxide, glycerol, glycidol surfactants, and the like; such cationic surfactants as higher alkylamines, quaternary ammonium salts, pyridine or other heterocyclic compounds, phosphonium or sulfonium salts, and the like; those anionic surfactants containing such acid radicals as carboxylic, sulfonic and phosphoric acid radicals, sulfuric acid ester or phosphoric acid ester radicals; such amphoteric surfactants as amino acids, aminosulfonic acids, sulfuric acid esters or phosphoric acid esters of amino alcohols; and the like.

Those surfactants usable as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,145,649, 3,441,413, 3,442,654, 3,475,174 and 3,545,974, West German OLS Pat. No. 1,942,665, British Pat. Nos. 1,077,317 and 1,198,450, and the like; the "Kaimen Kasseizai No Gosei To Sono Oyo" (Synthesis and Applications of Surface Active Agents) written by Ryohei Oda (published by Maki Shoten in 1964); the "Surface Active Agents" written by A. W. Bailey (published by Interscience Publication, Inc. in 1958); the "Encyclopedia of Surface Active Agents, Vol. 2" (published by Chemical Publishing Company in 1964); and the "Kaimen Kasseizai Benran" (Handbook of Surface Active Agents) 6th edit. (published by Sangyo Tosho Kabushiki Kaisha on Dec. 20, 1956).

These surfactants may be added singly or in the form of a mixture. They are used as antistatic agents, but may at times be used for different purposes, e.g., for improving dispersibility, magnetic characteristics or lubricity, or used as coating aids.

The formation of a magnetic recording layer may be carried out by coating on a nonmagnetic support a coating liquid prepared by dissolving some of the above-described compositions into an organic solvent.

Examples of organic solvents which can be used in coating the magnetic recording layer include ketones such as acetone, methylethyl ketone, methyl-isobutyl ketone, cyclohexanone, and the like; alcohols such as methanol, ethanol, propanol, butanol, and the like; esters such as methyl acetate, ethyl acetate, butyl acetate, ethyl lactate, glycol-monoethyl-ether acetate, and the like; glycol ethers such as diethyl ether, glycol-dimethyl ether, glycol-monoethyl ether, dioxane, and the like; such tars (aromatic hydrocarbons) as benzene, toluene, xylene, and the like; chlorinated hydrocarbons such as methylene chloride, ethylene chloride, carbon tetrachloride, chloroform, ethylene chlorohydrin, dichlorobenzene, and the like.

For the support of the magnetic recording layer, there may be used those materials including polyesters such as polyethylene terephthalate, polyethylene-2,6-naphthalate, and the like; polyolefins such as polypropylene, and the like; cellulose derivatives such as cellulose triacetate, cellulose diacetate, and the like; plastics such as polycarbonate, and the like; nonmagnetic metals such as Cu, Al, Zn, and the like; ceramics such as glass, porcelain, earthenware, and the like.

The thickness of these nonmagnetic supports, if the support is in the film or sheet form, is to be from about 3 to about 100 $\mu$m and preferably from 5 to 50 $\mu$m, and if it is in the disc or card form, is to be from about 0.5 to about 10 mm. The support, if intended for use in a drum type recorder, is to be in the cylindrical form, and the thickness and concrete form thereof are to be determined according to the recorder used.

The above-described support may have a backcoat on the opposite side to the magnetic layer-coated side for preventing the support from electrostatic charge, transfer, and the like.

Details of the backcoat are described in, e.g., U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688, and the like.

The support is allowed to take any such a form as the sheet, card, disk or drum form, and various materials may be used, selecting according to the form required.

A magnetic powder is kneaded together with the previously mentioned binder material, dispersant, lubricant, abrasives, antistatic agent, and the like, to thereby produce a magnetic coating material.

In the kneading, the magnetic powder and the abovedescribed respective components are all simultaneously or successively put in a kneading machine. For example, there is such a procedure that a magnetic powder is added to a dispersant-containing solution, and the mixture is kneaded for a specified period, and after that the remaining components are added to the mixture to continue the kneading to thereby produce a magnetic coating material.

For the kneading and dispersing there may be used various kneading machines such as, for example, a two-roll mill, three-roll mill, ball mill, pebble mill, sand grinder, high-speed impeller disperser, high-speed stone mill, high-speed impact mill, Disperkneader, high-speed mixer, homogenizer, ultrasonic disperser, and the like.

Techniques of the kneading and dispersing are described in the "Paint Flow and Pigment Dispersion" written by T. C. Patton (published by John Willey & Sons in 1964), and also in U.S. Pat. Nos. 2,581,411 and 2,855,156.

As methods for the formation of a magnetic recording layer by coating the above-described magnetic coating material on a support, the air-doctor coat, blade coat, air-knife coat, squeeze coat, impregnation coat, reverse roll coat, transfer roll coat, gravure coat, kiss coat, cast coat, spray coat, and the like may be utilized, and other methods may also be used. These methods are described in detail in the Coating Technology" p.p. 253–277 (published by Asakura Shoten on Mar. 20, 1971).

The magnetic recording layer coated on a support by such methods, if necessary, is subjected to a treatment for the orientation of the magnetic powder in the layer, and after that the formed magnetic recording layer is dried. Further, the layer, if necessary, is subjected to a surface smoothing treatment, and then cut into pieces in a desired form, thereby producing the magnetic recording medium of the present invention. In this case, the orientation magnetic field is from about 500 to 2000 gauss in A.C. or D.C., drying temperature is about 50° C. to 100° C. and the drying time is from about 3 to about 10 minutes. Methods for the orientation of the magnetic powder are described in, e.g., U.S. Pat. Nos. 1,949,840, 2,796,359, 3,001,891, 3,172,776, 3,416,949, 3,473,960 and 3,681,138, and Japanese Patent Examined Publication Nos. 3427/1957, 28368/1964, 23624/1965, 23625/1965, 13181/1966, 13043/1973 and 39722/1973, and the like.

The direction in which the magnetic material is oriented is specified according to uses, Namely, in the case of a sound tape, small-sized video tape, and memory tape, the orientation is to be parallel with the longitudinal direction of the tape, while in the case of a video tape for broadcasting service use, the orientation is to be made in the direction with an inclination of from 30 to 90 degrees to the longitudinal direction of the tape.

The present invention is illustrated further in detail with reference to examples below. It is understood easily by those skilled in the art that the components, proportion and procedures described herein are allowed to be changed as far as they do not diverge from the spirit of the present invention.

Accordingly, the present invention should not be limited to the following examples. In addition, the word "part(s)" used hereinafter means "part(s) by weight".

EXAMPLE 1

| | |
|---|---|
| Magnetic metallic powder | 75 parts |
| Partially hydrolyzed vinyl chloride-vinyl acetate copolymer | 7.5 parts |
| Polyurethane | 7.5 parts |
| Silicone oil | 1.5 parts |
| Methyl-ethyl ketone | 70 parts |
| Toluene | 60 parts |
| Cyclohexane | 5 parts |
| 1,10-phenanthroline ($K = 20.0$) | 3 parts |

The above components were sufficiently mixed and dispersed, and to the mixture were added 5 parts of Coronate L (polyisocyanate manufactured by Nippon Polyurethane Co., Ltd.: an ethyl acetate solution containing 75% by weight of 1-mol trimethylol propane - 3-mol tolylenediisocyanate adduct) and uniformly mixed to thereby prepare a black magnetic coating material.

The resulting coating material was coated on a 15-micronthick polyethylene terephthalate film with one side thereof being impressed with a magnetic field of 2000 gauss so that the coated thickness after drying becomes 5μ. The thus obtained sample with the master-roll width was subjected to a super-calender treatment, and then slitted into 3.81 mm- and 12.7 mm-wide slit rolls, which were regarded as an audio tape sample and video tape sample, respectively, of the present invention (T-1).

EXAMPLE 2

Tape samples of the present invention (T-2) were obtained in a similar manner to that in Example 1 with use of pyridine-2,6-dicarboxylic acid in place of the 1,10-phenanthroline that was used in Example 1.

EXAMPLE 3

Tape samples of the present invention (T-3) were obtained in a similar manner to that in Example 1 with use of 2-methyl-8-hydroxyquinonline ($K=17.10$) in place of the 1,10-phenanthroline that was used in Example 1.

EXAMPLE 4

Tape samples of the present invention (T-4) were obtained in a similar manner to that in Example 1 with use of 8-hydroxyquinoline ($K=38.0$) in place of the 1,10-phenanthroline that was used in Example 1.

COMPARATIVE EXAMPLE

As a comparison, tape samples (T-5) were prepared in a similar manner to that in Example 1 but with the omission of the 1,10-phenanthroline used in Example 1.

Each of the samples prepared in the above-described examples and the comparative example was allowed to stand under an atmospheric condition at a temperature of 60° C. and relative humidity of 80%, and measured for the variation-per-day change on standing of the residual magnetic flux density ($\phi r$). The measured results are as shown in FIG. 1.

In FIG. 1, the axis of ordinate represents the retaining rate of φr(%), while the axis of abscissa represents the number of days.

As apparent from FIG. 1, the samples of the present invention (T-1 to T-4) are deteriorated with time at smaller rates than that of the comparative sample (T-5), and show very excellent oxidation-resistant characteristics.

Further, the initial magnetic characteristics in Examples 1 and 3 and Comparative Example are given in Table 1:

TABLE 1

|  | Magnetic coercive force (Oe) | Residual magnetic flux density (gauss) | Saturation magnetic flux density (gauss) | Square ratio |
| --- | --- | --- | --- | --- |
| T-1 | 1120 | 2250 | 2830 | 0.80 |
| T-3 | 1090 | 3010 | 3740 | 0.80 |
| T-5 | 1170 | 2720 | 3340 | 0.81 |

The words "square ratio" means the ratio of the residual magnetic flux density to the saturation magnetic flux density, and the closer to 1, the ratio, the better.

Examples 1–4 and Comparative Example show nearly the same values of the square ratio and also of the dispersibility.

From the above results, it is understood that the incorporation of the compound of the present invention improves the oxidation resistance of the magnetic recording medium without affecting the dispersibility of the magnetic powder.

Figure 1:
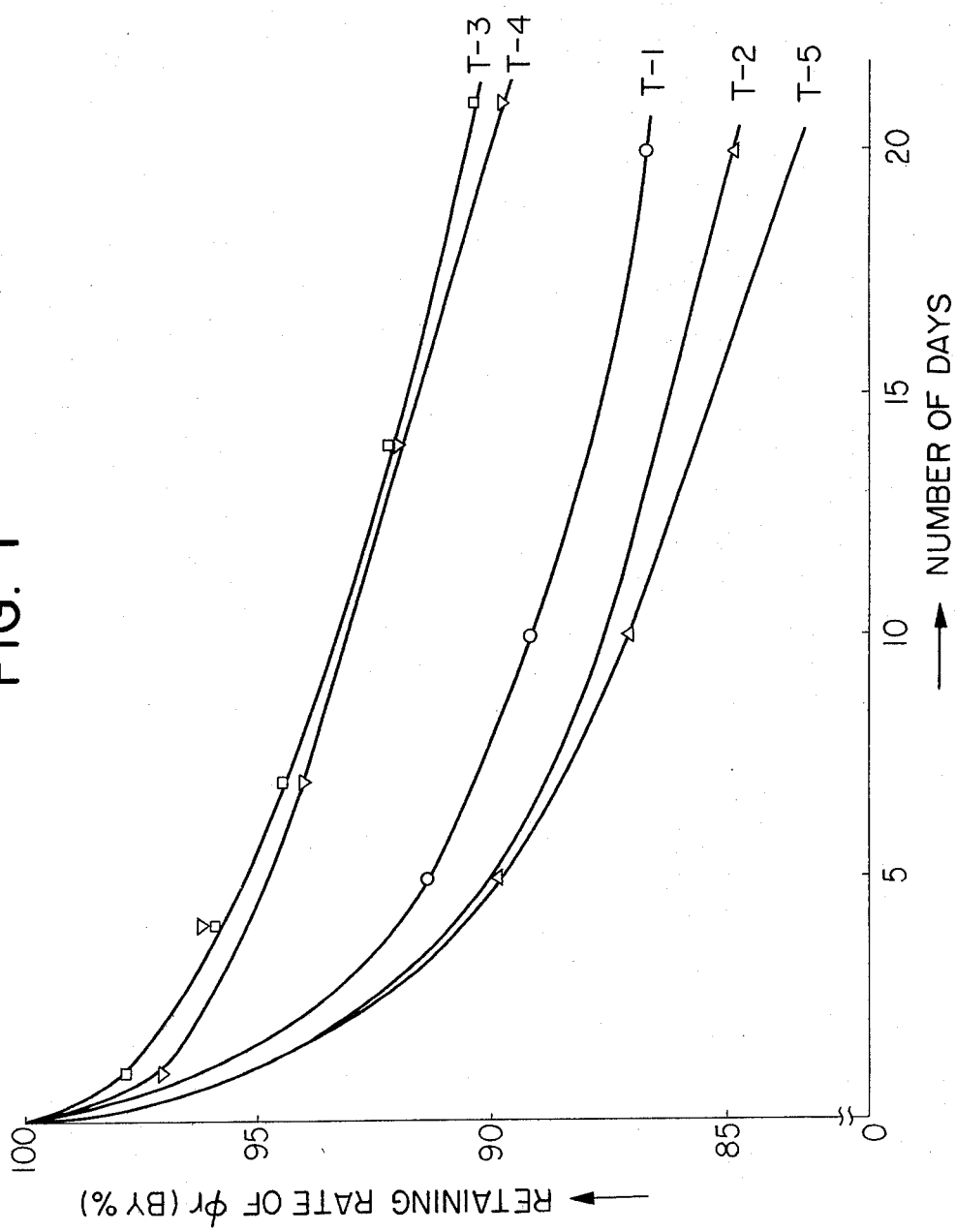
FIG. 1 is a graph showing variation-per-day changes on standing of the magnetic flux densities (φr) of the tape samples prepared in Examples and Comparative Examples when they are allowed to stand under the atmospheric condition at a temperature of 60° C. and relative humidity of 80% wherein the axis of ordinate represents the retaining rate of residual magnetic flux density φr(%) and the axis of abscissa represents the number of days.

What is claimed is:

1. A magnetic recording medium having a non-magnetic support carrying a magnetic layer which layer comprises a ferromagnetic metallic powder, a binder material, and a nitrogen-containing compound which is capable of forming a complex with an iron ion and whose stability constant with said iron ion is not less than 15.

2. The medium of claim 1 wherein said material is taken from the class consisting of thermoplastic thermosetting, and reactive type resins and mixtures thereof.

3. The medium of claim 2 wherein said thermoplastic resins have a softening point of not more than 150° C., an average molecular weight of from 10,000 to 200,000, and a polymerization degree of about 200 to about 2,000; said thermosetting and reactive type resins have a molecular weight of not more than about 200,000 in coating liquid form.

4. The medium of claim 1 wherein said compound has a 5 or 6 member nitrogen-containing heterocyclic group.

5. The medium of claim 4 wherein said compound has a 5- or 6-member aromatic ring, said aromatic ring having amino group or substituted amino group.

6. The medium according to claim 1 wherein said compound has the formula

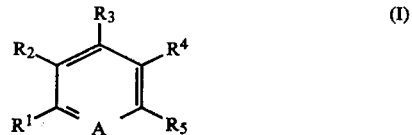

wherein $R_1$ and $R_5$ are each hydrogen, lower alkyl, —COOM, or hydroxyl; $R_2$ and $R_4$ are each hydrogen, lower alkyl, —COOM, pyridyl, substituted or unsubstituted amino, hydroxyl, or —SO$_3$M; $R_3$ is hydrogen or hydroxyl; M is hydrogen or an alkali metal; and A is nitrogen or

provided that when A is

at least one of $R_2$ and $R_4$ is a pyridyl or a substituted or unsubstituted amino group; said $R_1$ and $R_2$ being allowed to link with each other to form a benzene ring, said benzene ring being allowed to have a substituent and to form a condensed ring.

7. The medium according to claim 6 wherein said compound has the formula

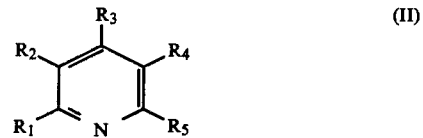

8. The medium according to claim 6 wherein said compound has the formula

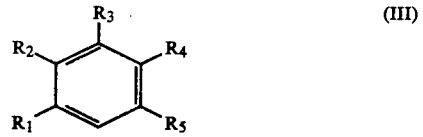

9. A magnetic recording medium according to claim 4 wherein said nitrogen-containing compound is selected from the group consisting of 1,10-phenathroline, 5-amino-salicylic acid, 2-methyl-8-hydroxyquinoline, Pyridine-2,6-dicarboxylic acid, 5-phenyl-1,10-phenanthroline, 5-methyl-1,10-phenanthroline, 8-hydroxyquinoline and 8-hydroxy-5-methyl-quinoline.

* * * * *